(12) United States Patent
Baskaran et al.

(10) Patent No.: US 12,475,471 B2
(45) Date of Patent: Nov. 18, 2025

(54) METHOD AND SYSTEM FOR PREDICTION OF SMART CONTRACT VIOLATION USING DYNAMIC STATE SPACE CREATION

(71) Applicant: Telefonaktiebolaget LM Ericsson (publ), Stockholm (SE)

(72) Inventors: Sandhya Baskaran, Chennai (IN); Swarup Kumar Mohalik, Bangalore (IN); Anshu Shukla, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 844 days.

(21) Appl. No.: 17/266,890

(22) PCT Filed: Aug. 17, 2018

(86) PCT No.: PCT/IN2018/050533
§ 371 (c)(1),
(2) Date: Feb. 8, 2021

(87) PCT Pub. No.: WO2020/035871
PCT Pub. Date: Feb. 20, 2020

(65) Prior Publication Data
US 2021/0312472 A1    Oct. 7, 2021

(51) Int. Cl.
*G06Q 30/018*  (2023.01)
*G06F 9/445*   (2018.01)
(Continued)

(52) U.S. Cl.
CPC ..... *G06Q 30/0185* (2013.01); *G06F 11/3616* (2013.01); *G06N 5/04* (2013.01); *G06Q 20/401* (2013.01); *G06F 9/44589* (2013.01)

(58) Field of Classification Search
CPC .............. G06Q 30/0185; G06Q 20/401; G06F 11/3616; G06F 9/44589; G06N 5/04
See application file for complete search history.

(56) References Cited

U.S. PATENT DOCUMENTS

2017/0031329 A1*  2/2017  Inagaki ............... G06N 3/08
2017/0244721 A1*  8/2017  Kurian ............... H04L 63/105
(Continued)

FOREIGN PATENT DOCUMENTS

WO   2018/051305 A1   3/2018
WO   2018/142948 A1   8/2018

OTHER PUBLICATIONS

NPL ("solidity-cfg-builder", shaunazzopardi, Feb. 20, 2018) (Year: 2018).*

(Continued)

*Primary Examiner* — Noor Alkhateeb
(74) *Attorney, Agent, or Firm* — Sage Patent Group

(57) ABSTRACT

A method implemented by a network device to predict smart contract violations, where the network device is communicatively coupled to one or more computing nodes that execute one or more smart contracts that are configured to perform transactions on a blockchain. The method includes generating a control flow graph for each of the one or more smart contracts, retrieving, from the blockchain, a current state of a variable utilized by the one or more smart contracts following execution of a transaction that updates the variable, generating or updating a state space tree based on the current state of the variable and the control flow graphs generated for the one or more smart contracts, determining whether the state space tree meets a predefined violation requirement, and sending an alert to the one or more computing nodes in response to determining that the state space tree meets the violation requirement.

16 Claims, 9 Drawing Sheets

(51) Int. Cl.
*G06F 11/3604* (2025.01)
*G06N 5/04* (2023.01)
*G06Q 20/40* (2012.01)

(56) References Cited

U.S. PATENT DOCUMENTS

| | | | | |
|---|---|---|---|---|
| 2018/0124105 | A1 | 5/2018 | Rodrigues | |
| 2018/0137465 | A1* | 5/2018 | Batra | H04L 67/104 |
| 2018/0260302 | A1* | 9/2018 | Mola | G06F 16/9038 |
| 2019/0018984 | A1* | 1/2019 | Setty | H04L 9/3239 |
| 2019/0026146 | A1* | 1/2019 | Peffers | G06F 9/5044 |
| 2019/0036712 | A1* | 1/2019 | Qiu | G06Q 20/38215 |
| 2019/0108140 | A1* | 4/2019 | Deshpande | G06F 21/10 |
| 2019/0130368 | A1* | 5/2019 | Li | G06Q 20/4016 |
| 2019/0303932 | A1* | 10/2019 | Klaedtke | H04L 9/0637 |
| 2019/0377904 | A1* | 12/2019 | Sinha | H04L 9/3239 |
| 2020/0021439 | A1 | 1/2020 | Sato | |
| 2020/0099529 | A1* | 3/2020 | Chan | G06Q 20/3674 |

OTHER PUBLICATIONS

NPL "Flattening Contracts and Debugging with Remix", Jun. 13, 2018, Ahmed Bouchefra) https://web.archive.org/web/20180726013457/https://www.sitepoint.com/flattening-contracts-debugging-remix/ (Year: 2018).*

Extended European Search Report, EP App. No. 18930031.2, Feb. 28, 2022, 7 pages.

International Preliminary Report on Patentability, PCT App. No. PCT/IN2018/050533, Mar. 4, 2021, 6 pages.

3GPP TR 23.789 V13.0.0, "Monitoring enhancements," Technical Report, Mar. 2015, pp. 1-33.

3GPP TR 28.801 V15.1.0, "Study on management and orchestration of network slicing for next generation network," Technical Report, Jan. 2018, pp. 1-75.

3GPP TS 23.682 V15.5.0, "Architecture enhancements to facilitate communications with packet data networks and applications," Technical Specification, Jun. 2018, pp. 1-125.

Azzopardi, S., "Contractlarva v0.2a Tutorial," Nov. 19, 2019, downloaded from https://github.com/gordonpace/contractLarva, pp. 1-15.

Baldoni, et al., "A Survey of Symbolic Execution Techniques," ACM Computing Surveys, vol. 51, No. 3, Article 0, May 2, 2018, pp. 1-37.

Ellul, et al., "Runtime Verification of Ethereum Smart Contracts," Int'l Workshop on Blockchain Dependability, in conjunction with 14th Euro. Dependable Computing Conference (EDCC), Dec. 2018, pp. 1-6.

International Search Report and Written Opinion, App. No. PCT/IN2018/050533, Oct. 31, 2018, pp. 1-8.

Kalra, et al., "ZEUS: Analyzing Safety of Smart Contracts," Network and Distributed Systems Security (NDSS) Symposium, Feb. 18-21, 2018, pp. 1-5.

Pace, et al., "Contractlarva v0.2a User Manual," Dec. 5, 2017, updated Oct. 11, 2019, downloaded from https://github.com/gordonpace/contractLarva, pp. 1-8.

\* cited by examiner

```
Contract SCA {
   State rootState;
   StateSpaceTree curTree;
   uint8 treeDepth;
   Requirements currReq;

SCA(addr[], uint8 d) {
      cfg = constructCFG(addr);
      rootState = getCurrState();
      constructTree(rootState, cfg, d);
   }

SetRequirements(req) {
      currReq =  req;
   }

SetDepth(uint8 d) {
      treeDepth = d;
   } verify(trans) {
      // retrieve current state from the blockchain
      getState(rootState);

// update state space tree up to treeDepth
      update(currTree, rootState, cfg, treeDepth);

// report prediction of violation
      reportViolationIfAny();
   }
}
```

SCA Smart Contract 130

Fig. 2

```
Contract any {
   set(x) public {
      // smart contract transaction
      val = x;
   }
}
```

Original Smart Contract 310A

```
Contract any {
   bool ifReq;
   addr self;
   int8 depth;

set(x) public {
      // smart contract transaction
      val = x;

if ifReq == false
      {
         // register this smart contract with SCA
         SCAobj = registerSCA(self, depth);
      }
      else
      {
         // verify after each transaction
         SCAobj.verify();
      }
   } registerSCA(self, depth) public {
      ifReq = true;
      return SCA(self, depth);
   }
}
```

Converted Smart Contract 310B

Fig. 3

METHOD AND SYSTEM FOR PREDICTION OF SMART CONTRACT VIOLATION USING DYNAMIC STATE SPACE CREATION

CROSS-REFERENCE TO RELATED APPLICATIONS

This application is a national stage of International Application No. PCT/IN2018/050533, filed Aug. 17, 2018, which is hereby incorporated by reference.

TECHNICAL FIELD

Embodiments of the invention relate to the field of smart contracts, and more specifically, to predicting smart contract violations.

BACKGROUND ART

A blockchain is a list of records called "blocks" that are stored in a distributed and decentralized manner. Each block in a blockchain typically includes a cryptographic hash of the previous block (except for the very first block), a timestamp, and transaction data (e.g., a record of the transactions that have occurred and the state of system variables). Blockchain is considered a secure medium for recording transactions as it has inherent properties that resist changes to existing blocks. Since each block in the blockchain is cryptographically linked to a previous block, any changes to a block cannot be made without changing all of the previous blocks, which makes the blockchain secure. In order to add a block to a blockchain, contenders need to provide proof of work (or other type of proof such as proof of stake or proof of space) that is verifiable by others. Proof of work is a concept where contenders must solve a computationally expensive puzzle that can be verified by others before being able to add a block to the blockchain. The first contender to solve the puzzle gets to add the block to the blockchain and typically receives as financial reward for its efforts.

A smart contract is a protocol intended to digitally facilitate, verify, and/or enforce the negotiation and/or performance of a contract. Smart contracts can be implemented in a blockchain to facilitate verification and/or enforcement of service level agreements among the parties involved in a transaction. Smart contracts are typically implemented as a static piece of code stored in a blockchain, and can be used to ensure the credibility of the transactions added to the blockchain by detecting violations of service level agreements.

Typically, smart contracts are reactive processes that detect violations only after they have occurred in the transaction state. Consequently, even if the violation was a result of certain transactions in the past, subsequent transactions following the transactions that caused the violation are carried out even though they are invalid. In a blockchain that requires proof of work (or other type of proof) for contenders to add a block to the blockchain, this results in a tremendous waste in computing resources, as the contenders will attempt to solve computationally expensive puzzles for invalid transactions. The problem is compounded when there are multiple smart contracts being executed and multiple contenders contending to add blocks to the blockchain. Also, when a violation occurs, the requestor needs to assess the state of the state variables by parsing through the blocks in the blockchain to identify the transaction that caused the violation, and re-execute any transactions to restore the correct state.

SUMMARY

A method is implemented by a network device to predict smart contract violations, where the network device is communicatively coupled to one or more computing nodes that execute one or more smart contracts that are configured to perform transactions on a blockchain. The method includes generating a control flow graph for each of the one or more smart contracts, retrieving, from the blockchain, a current state of a variable utilized by the one or more smart contracts following execution of a transaction that updates the variable, generating or updating a state space tree based on the current state of the variable and the control flow graphs generated for the one or more smart contracts, determining whether the state space tree meets a predefined violation requirement, and sending an alert to the one or more computing nodes in response to determining that the state space tree meets the violation requirement.

A network device is configured to predict smart contract violations, where the network device is to be communicatively coupled to one or more computing nodes that execute one or more smart contracts that are configured to perform transactions on a blockchain. The network device includes a set of one or more processors and a non-transitory machine-readable storage medium having stored therein a smart contract agent component. The smart contract agent component, when executed by the set of one or more processors, causes the network device to generate a control flow graph for each of the one or more smart contracts, retrieve, from the blockchain, a current state of a variable utilized by the one or more smart contracts following execution of a transaction that updates the variable, generate a state space tree based on the current state of the variable and the control flow graphs generated for the one or more smart contracts, determine whether the state space tree meets a predefined violation requirement, and send an alert to the one or more computing nodes in response to determining that the state space tree meets the violation requirement.

A non-transitory machine-readable medium has computer code stored therein, which when executed by a set of one or more processors of a network device communicatively coupled to one or more computing nodes that execute one or more smart contracts that are configured to perform transactions on a blockchain, causes the network device to perform operations for predicting smart contract violations. The operations include generating a control flow graph for each of the one or more smart contracts, retrieving, from the blockchain, a current state of a variable utilized by the one or more smart contracts following execution of a transaction that updates the variable, generating or updating a state space tree based on the current state of the variable and the control flow graphs generated for the one or more smart contracts, determining whether the state space tree meets a predefined violation requirement, and sending an alert to the one or more computing nodes in response to determining that the state space tree meets the violation requirement.

BRIEF DESCRIPTION OF THE DRAWINGS

The invention may best be understood by referring to the following description and accompanying drawings that are used to illustrate embodiments of the invention. In the drawings:

FIG. 2 is a diagram illustrating an outline of the SCA smart contract, according to some embodiments.

FIG. 3 is a diagram illustrating how a smart contract can be converted, according to some embodiments.

DETAILED DESCRIPTION

Figure 1:
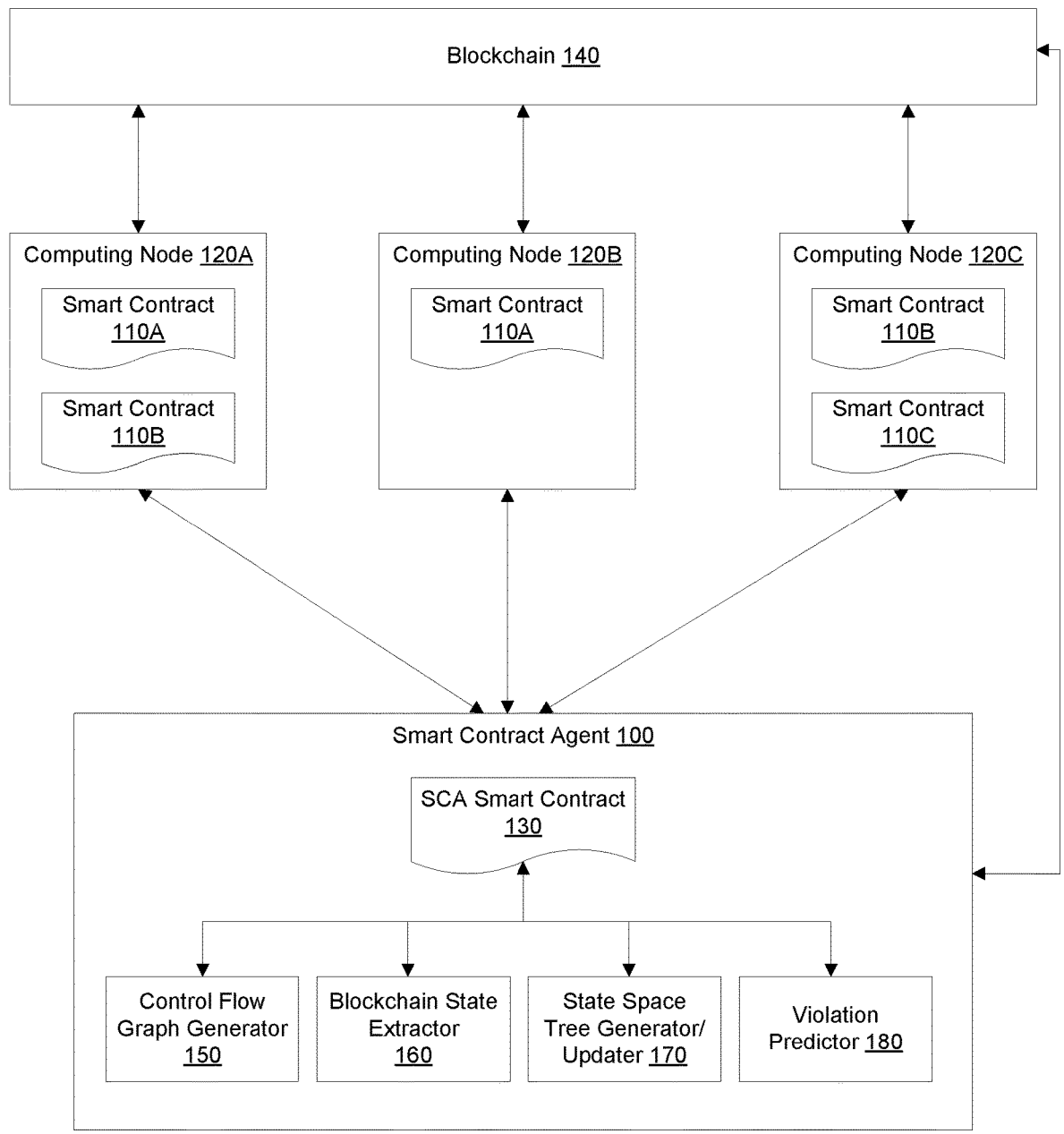
FIG. 1 is a block diagram of a system in which smart contract violations can be predicted, according to some embodiments.

The following description describes methods and apparatus for predicting smart contract violations. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, typically, smart contracts are reactive processes that detect violations only after they have occurred in the transaction state. Consequently, even if the violation was a result of certain transactions in the past, subsequent transactions following the transactions that caused the violation are carried out even though they are invalid. In a blockchain that requires proof of work (or other type of proof) for contenders to add a block to the blockchain, this results in a tremendous waste in computing resources, as the contenders will attempt to solve computationally expensive puzzles for invalid transactions. The problem is compounded when there are multiple smart contracts being executed and multiple contenders contending to add blocks to the blockchain. Also, when a violation occurs, the requestor needs to assess the state of the state variables (i.e., variables that are stored in the blockchain) by parsing through the blocks in the blockchain to identify the transaction that caused the violation, and re-execute any transactions to restore the correct state.

Embodiments described herein provide a smart contract agent that is able to predict smart contract violations before they occur, as well as identify the specific scenarios that lead to smart contract violations. According to some embodiments, the smart contract agent achieves this by generating a state space tree, where the root node of the state space tree represents the current state of a variable utilized by one or more smart contracts and the descendant nodes stemming from the root node represent the possible states of the variable that can be reached from the current state. The smart contract agent may generate the state space tree based on the control flow graphs of the one or more smart contracts that utilize the variable. The smart contract agent may update the state space tree following each transaction that updates the variable (so that the state space tree reflects the updated state of the variable). The smart contract agent may then analyze the state space tree to determine whether any of the nodes in the state space tree represent a state that is considered to be a smart contract violation. If the state space tree includes a sufficient number or percentage of nodes representing a state that is considered to be a smart contract violation, then the smart contract agent may generate an alert to the blockchain participants indicating as such. The alert may also indicate the specific scenarios that lead to a smart contract violation. This "prediction" helps avoid smart contract violations by allowing users and/or applications to intervene before a smart contract violation occurs. This in turn helps avoid unnecessary mining (e.g., contenders working on proof of work or proof of space), which results in being able to conserve valuable computing resources and power.

FIG. 1 is a block diagram of a system in which smart contract violations can be predicted, according to some embodiments. As shown in the diagram, the system includes a smart contract agent 100, computing nodes 120A-C, and a blockchain 140. Computing nodes 120A-C are participants in the blockchain 140, and can execute one or more smart contracts 110. In this example, computing node 120A executes smart contracts 110A and 110B, computing node 120B executes smart contract 110A, and computing node 120C executes smart contracts 110B and 110C. Different computing nodes 120 can execute the same smart contract. In this example, both computing node 120A and computing node 120B execute smart contract 110A and both computing node 120A and computing node 120C execute smart contract 110B. In one embodiment, one or more of the smart contracts 110 are stored in the blockchain 140 itself. Executing a smart contract 110 may involve performing transactions on the blockchain 140 (e.g., recording transactions in the blockchain 140). For sake of illustration, the diagram shows three computing nodes 120 that are executing smart contracts 110. However, it should be understood that the system can include more or less than three computing nodes 120.

The smart contract agent 100 is a trusted computing node that has access to the blockchain 140, and has an address that is known to the computing nodes 120. The smart contract agent 100 includes a smart contract agent (SCA) smart contract 130 that is configured to predict smart contract violations. The computing nodes 120 can access the SCA smart contract 130 (e.g., via an Application Programming Interface (API)). The smart contract agent 100 further includes a control flow graph generator 150, a block chain state extractor 160, a state space tree generator/updater 170, and a violation predictor 180. As will be described in additional detail below, the SCA smart contract 130 may utilize one or more of these components to predict smart contract violations. The smart contract agent 100 can be implemented by one or more computing/network devices. In one embodiment, one or more components of the smart contract agent 100 can be implemented in a cloud computing environment.

FIG. 2 is a diagram illustrating an outline of the SCA smart contract, according to some embodiments. As shown in FIG. 2, the SCA smart contract 130 defines variables "rootState," "curTree," "treeDepth," and "currReq." The "rootState" variable specifies the current state of a variable of interest (e.g., a state variable utilized by smart contracts 110). The "curTree" variable specifies the state space tree that represents the possible states of the variable of interest that can be reached from the current state. The state space tree is a data structure that models/represents one or more states of the variable of interest, where the states are modeled/represented as nodes in the data structure and actions that can change the variable of interest from one state to another state are represented as edges in the data structure. The "treeDepth" variable specifies the maximum depth that the state space tree can have. The "currReq" variable specifies the requirement that needs to be met in order to report a prediction of a smart contract violation.

The SCA smart contract also defines a constructor function called "SCA." The constructor function takes "addr" and "d" as arguments. The "addr" argument specifies the address of a smart contract 110. The "d" argument specifies the maximum depth of the state space tree. The constructor function generates a control flow graph for the smart contract 110 specified by the "addr" variable and stores the result in the "cfg" variable ("cfg=constructCFG(addr);"). Also, the constructor function retrieves the current state of the variable of interest from the blockchain 140 and stores the result in the "rootState" variable ("rootState=getCurrState( );"). The constructor function then generates a state space tree, where the root node of the state space tree represents the current state of the variable of interest ("constructTree(rootState, cfg, d);"). The state space tree is generated based on the previously generated control flow graph up to a depth specified by the "d" argument passed into the constructor function.

The SCA smart contract 130 also defines a function called "SetRequirements." This function takes "req" as an argument. The "req" argument specifies the requirement that needs to be met in order to report a prediction of a smart contract violation. The "SetRequirements" function sets the "currReq" variable to the value of the "req" argument passed into the function. The SCA smart contract 130 also defines a function called "SetDepth." This function takes "d" as an argument. The "d" argument specifies the maximum depth of the state space tree. The "SetDepth" function sets the "treeDepth" variable to the value of the "d" argument passed into the function. Thus, the "SetRequirements" function and the "SetDepth" function are "setter" functions that can be used to set the values of the "currReq" variable and the "treeDepth" variable, respectively.

The SCA smart contract 130 also defines a function called "verify." This function takes "trans" as an argument. The "trans" argument specifies the current blockchain transaction being executed. The "verify" function retrieves the current state of the variable of interest from the blockchain 140 and stores the result in the "rootState" variable ("getState(rootState);"). Also, this function updates the state space tree to reflect the current state of the variable, and stores the result in the "curTree" variable ("update(currTree, rootState, cfg, treeDepth);"). The state space tree is updated based on the current state of the variable specified by the "rootState" variable and the control flow graph specified by the "cfg" variable up to a depth specified by the "treeDepth" variable. Also, this function reports a prediction of a smart contract violation (if any) "reportViolationIfAny( );"). It should be understood that the specific computer program code shown in the diagrams and described herein is provided by way of example to aid in the understanding of the invention, and not intended to be limiting. It should be understood that the techniques disclosed herein can be implemented using different computer program code.

Smart Contract Conversion

In one embodiment, each smart contract for which smart contract violations will be predicted is converted into a functionally equivalent smart contract, where each transaction in that smart contract that updates the variable of interest is annexed by a call to the "verify" function defined by the SCA smart contract. This can happen prior to deployment of the smart contract to avail the smart contracts to the prediction capabilities of the smart contract agent 100. FIG. 3 is a diagram illustrating an example of how a smart contract can be converted, according to some embodiments. As shown in the diagram, the original smart contract 310A is a smart contract called "any." This smart contract defines a function called "set." This function takes "x" as an argument and sets the value of the "val" variable (which is the variable of interest) to the value of the "x" argument passed into the function. The converted smart contract 310B is similar to the original smart contract 310A, except that it adds functionality to register the smart contract with the smart contract agent 100 and to call the "verify" function after the transaction that updates the "val" variable. The converted smart contract 310B defines a function called "registerSCA" which can be called to register the smart contract with the smart contract agent 100. This function takes "self" and "depth" as arguments. The "self" argument specifies the address (e.g., Internet Protocol (IP) address) that can be used to access the current smart contract. The "depth" argument specifies the maximum depth of the state space tree. The "registerSCA" function sets the "ifReq" variable to true ("ifReq=true;") and calls the SCA constructor function ("return SCA(self, depth);"). The transaction that updates the "val" variable ("val=x;") is annexed by a check to determine whether the "ifReq" variable is set to false ("if ifReq==false";). If it is set to false, then this indicates that the current smart contract has not yet registered with the smart contract agent 100, and thus the current smart contract is registered by calling the "registerSCA" function ("SCAobj=registerSCA(self, depth);"). Otherwise, if the "ifReq" variable is not set to false (i.e., it is set to true), then the "verify" function is called ("SCAObj.verify( )"). This allows smart contract violation prediction to occur after each update to the "val" variable.

Returning to FIG. 1, as mentioned above, the smart contract agent 100 includes a control flow graph generator 150, a block chain state extractor 160, a state space tree generator/updater 170, and a violation predictor 180. The SCA smart contract 130 may utilize one or more of these components to predict smart contract violations. These components are described in additional detail below.

Control Flow Graph Generator

The control flow graph generator 150 is configured to generate a control flow graph for a smart contract. A control flow graph is a graph that represents the execution paths that can be traversed in a program (or a smart contract in this example) during execution. In one embodiment, the control flow graph generator 150 generates a control flow graph for each smart contract that registers with the smart contract agent 100. In one embodiment, the control flow graphs for the registered smart contracts are stored in an array data structure, and whenever a new smart contract registers with the smart contract agent 100 (e.g., using the "registerSCA( )" function), a control flow graph for that new smart contract is added to the array data structure. The control flow graph generator 150 may generate control flow graphs using any suitable control flow graph generation algorithm. In the example above, the SCA smart contract 130 may invoke the control flow graph generator 150 to generate a control flow graph by calling the "constructCFG( )" function.

Blockchain State Extractor

The blockchain state extractor 160 is configured to identify the public variables defined in smart contracts registered with the smart contract agent 100 and to retrieve the current state of a variable of interest from the blockchain 140. In one embodiment, the block chain state extractor 160 identifies the public variables using lexical analysis. In the example above, the SCA smart contract 130 may invoke the blockchain state extractor 160 to retrieve the current state of a variable from the blockchain 140 by calling the "getState( )" function.

State Space Tree Generator/Updater

The state space tree generator/updater 170 is configured to generate and update a state space tree. In one embodiment, the state space tree generator/updater 170 generates/updates a state space tree for a variable of interest, where the root node of the state space tree represents the current state of the variable of interest and the descendant nodes stemming from the root node represent the possible states of the variable of interest that can be reached from the current state. The state space tree generator/updater 170 may generate/update the state space tree based on one or more control flow graphs (for the smart contracts registered with the smart contract agent 100) up to a specified depth. For example, the state space tree generator/updater 170 may compute the states of the state space tree based on the operational semantics of transactions specified in the control flow graphs. In one embodiment, a state space tree is generated taking into account all the variables of interest that occur in the smart contracts. At the time of generating/updating the state space tree, it is typically not known which functions (a branch in the execution flow) will be called and with what parameter values. Some of the parameter values may supplied by internal variables which have already been instantiated, while other parameter values may be supplied by the user (or other external environment such as a sensor). Thus, in one embodiment, the input parameters for functions are retained symbolically so that the state as a whole is a symbolic state. For example, the input parameters for a function can be expressed as "(5, X)" and then expressed as "(5, X+1)" after the second input parameter is incremented. In this way, operations on the symbols (e.g., "X") can produce symbolic outputs. In one embodiment, the state space tree generator/updater 170 generates the state space tree based on theory described for symbolic search trees in software testing literature. In one embodiment, if there are multiple control flow graphs, the state space tree generator/updater 170 considers the interleaving of the transactions from the individual control flow graphs. For example, the state space tree generator/updater 170 may consider all of the functions from all of the control flow graphs when expanding the next level of the state space tree (but only those functions that affect the state will expand the state space tree). This allows the state space tree to capture the different possible interleaving of function calls from different smart contracts. For example, if there is a function "f" in a first smart contract having a control flow graph "CFG1" and there is a function "g" in a second smart contract having a control flow graph "CFG2," then the first level will have branches "f" and "g". The second level will have branches "ff," "fg," "gg," and "gf." In the example above, the SCA smart contract 130 may invoke the state space tree generator/updater 170 to generate and/or update a state space tree by calling the "constructTree( )" function and/or the "update( )" function.

Violation Predictor

The violation predictor 180 is configured to evaluate a state space tree against a specified requirement, and to send an alert to one or more computing nodes 120 if the state space tree meets the requirement (indicating prediction of a smart contract violation). The violation predictor 180 may send an alert to all of the computing nodes 120 participating in the blockchain 140 or just a subset thereof (e.g., just the computing nodes 120 that execute smart contracts involving the variable of interest or just the computing nodes 120 that have requested to receive alerts). As an example, the violation predictor 180 may analyze the state space tree to determine what percentage of nodes in the state space tree result in a smart contract violation (e.g., by checking the states of the state space tree—which can be indicated using concrete values, symbolic values, or a combination thereof), and send an alert if this percentage exceeds the percentage specified by the requirement. While the example specifies the requirement in terms of a percentage, it should be understood that the requirement can be specified using other conventions. For example, it can be specified as a safety property, a temporal logic formula, or using any convention that defines when the state space tree is considered to "predict" a smart contraction violation such that the violation predictor 180 should generate an alert. In one embodiment, the violation predictor 180 may also determine the scenarios that lead to a smart contract violation (e.g., by following the branches in the state space tree that result in a smart contract violation), and send the scenario(s) to one or more computing nodes 120 (e.g., for debugging purposes). In one embodiment, the violation predictor 180 may also send the probably of occurrence of each scenario to the one or more computing nodes 120. In one embodiment, the violation predictor 180 utilizes machine learning to predict smart contract violations. For example, the violation predictor 180 may train a machine learning system to predict smart contract violations based on learning a history of state space trees that resulted in prediction of a smart contract violation (e.g., which state space trees met the requirement such that it resulted in generating an alert). The violation predictor 180 may then predict a smart contract violation using the machine learning system (e.g., the machine learning system may take the current state space tree as an input and produce a prediction as an output). This may be particularly useful in the case where a smart contract that is responsible for causing a smart contract violation is not registered with the smart contract agent 100 (and so the state space tree does not take into account the states that can be produced by that smart contract). In one embodiment, the violation predictor 180 can make a recommendation to register suspect smart contracts (e.g., smart contracts that are causing frequent smart contract violations) with the smart contract agent 100. For example, when the violation predictor 180 predicts a violation, it can send an alert to the participants so that debugging can be performed to identify the point of failure in the smart contract. The scenarios that led to the point of failure and a finite part of the actual history of states seen leading up to that point of failure can be stored in a positive training set (e.g., {<history1>, <history2>, . . . }. In one embodiment, it can be assumed that all other history will not lead to failure so a negative training set can be created by randomly generating other histories. By using a supervised training algorithm on this data set, a supervised model can be generated that given a history can predict whether a smart contract will cause a violation. Suspect smart contracts can be flagged when the supervised model returns positive.

Figure 4A:
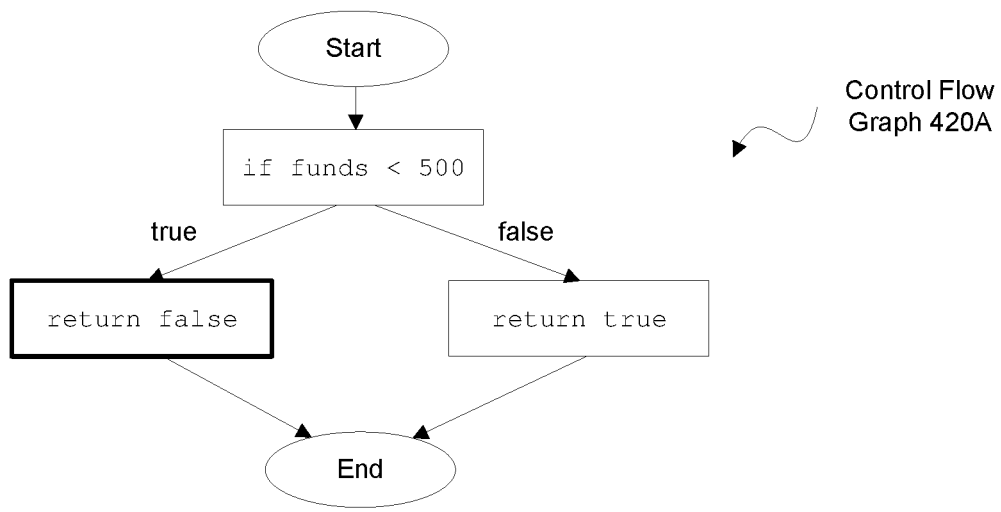
FIG. 4A is a diagram illustrating a smart contract and a control flow graph for that smart contract, according to some embodiments.

FIG. 4A is a diagram illustrating a smart contract and a control flow graph for that smart contract, according to some embodiments. As shown in the diagram, smart contract 410A is a smart contract called "FundTransfer_1." This smart contract defines a variable called "funds" and a function called "checkBalance." The "funds" variable specifies the current amount of funds in a user's account. The "checkBalance" function checks if the value of the "funds" variable is less than 500. If the value of the "funds" variable is less than 500, then the function returns "false" to indicate that this is a smart contract violation. Otherwise, if the value of the "funds" variable is not less than 500 (i.e., it is equal to or greater than 500), then the function returns "true" to indicate that there is no smart contract violation. The diagram also shows the corresponding control flow graph for smart contract 410A (which can be generated by the control flow graph generator 150). This control flow graph 420A represents the execution paths that can be traversed in smart contract 410A. The node that includes the "returns false" statement in control flow graph 420A is bolded to indicate that this is a smart contract violation.

Figure 4B:
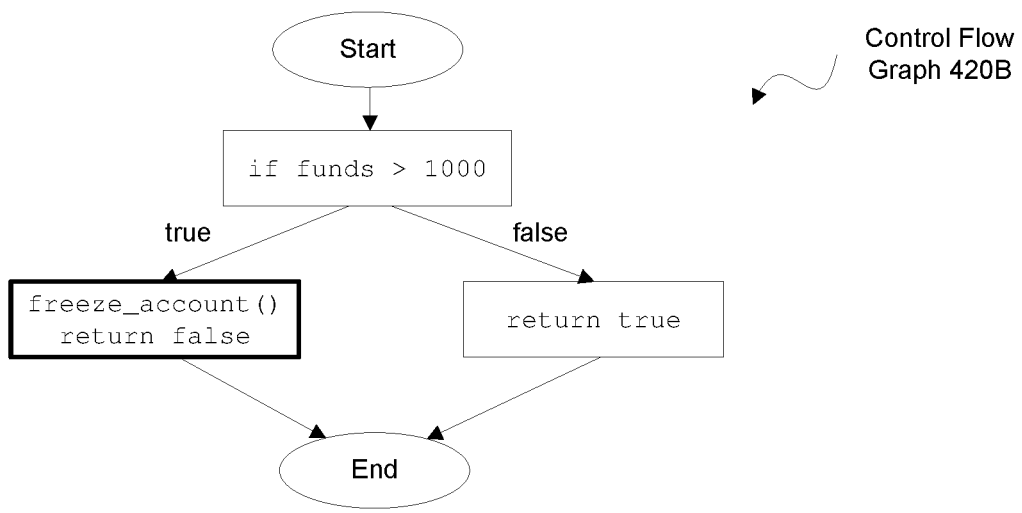
FIG. 4B is a diagram illustrating another smart contract and a control flow graph for that smart contract, according to some embodiments.

FIG. 4B is a diagram illustrating another smart contract and a control flow graph for that smart contract, according to some embodiments. As shown in the diagram, smart contract 410B is a smart contract called "FundTransfer_2." Similar to the "FundTransfer_1" smart contract described above, this smart contract also defines the "funds" variable and a function called "checkBalance." The "checkBalance" function checks if the value of the "funds" variable is greater than 1,000. If the value of the "funds" variable is greater than 1,000, then the function calls the "freeze_account( )" function to freeze the user's account and returns "false" to indicate that this is a smart contract violation. Otherwise, if the value of the "funds" variable is not greater than 1,000 (i.e., it is equal to or less than 1,000), then the function returns "true" to indicate that there is no smart contract violation. The diagram also shows the corresponding control flow graph for smart contract 410B (which can be generated by the control flow graph generator 150). This control flow graph 420B represents the execution paths that can be traversed in smart contract 410B. The node that includes the "returns false" statement in control flow graph 420B is bolded to indicate that this is a smart contract violation.

Thus, smart contract 410A and smart contract 410B indicate that a smart contract violation occurs if the value of "funds" is less than 500 or greater than 1,000. The smart contracts 410 can also include functionality to modify the "funds" variable (e.g., transactions that add/subtract to/from the value of the "funds" variable) (not shown).

Figure 5:
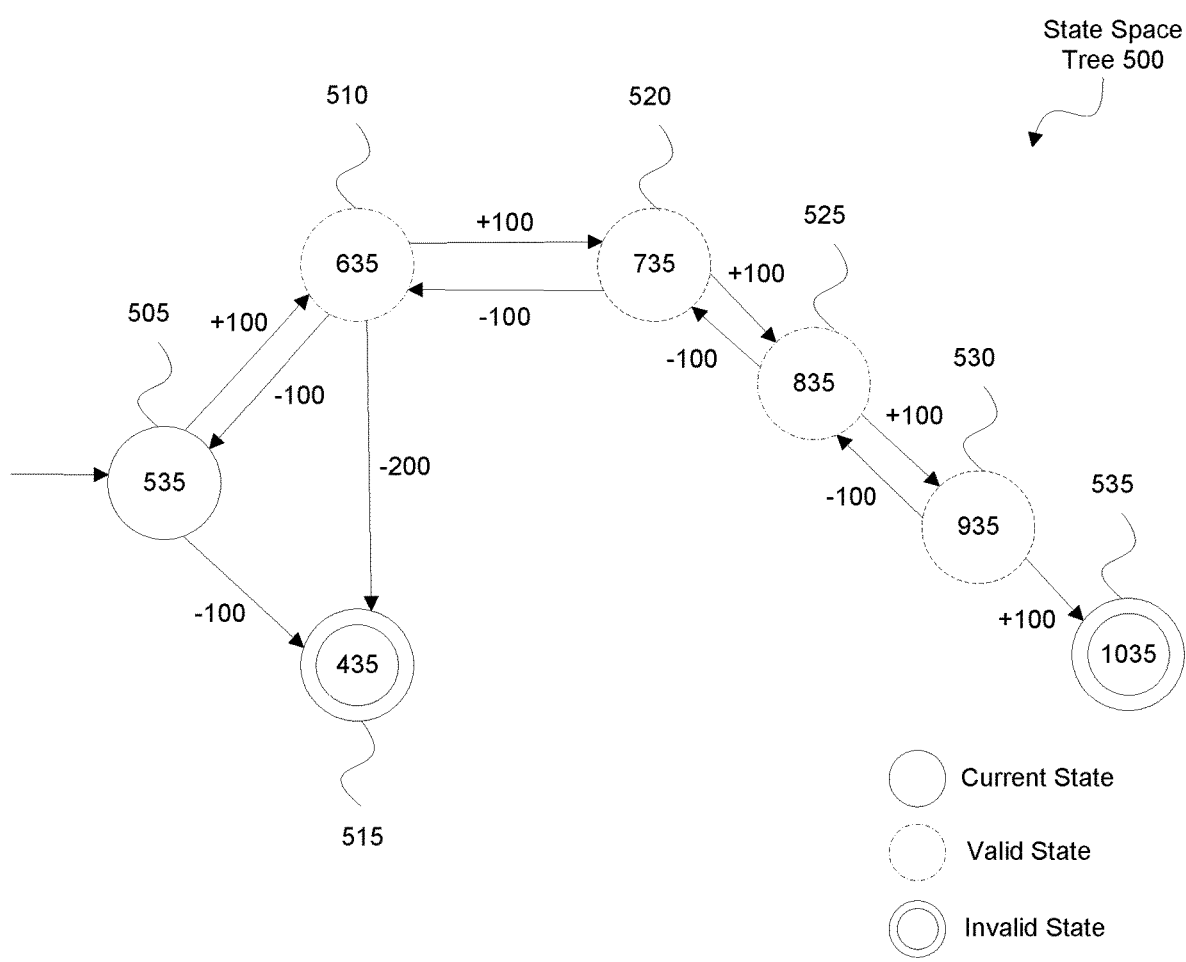
FIG. 5 is a diagram illustrating a state space tree, according to some embodiments.

FIG. 5 is a diagram illustrating a state space tree, according to some embodiments. Continuing with the example above, the diagram shows the state space tree 500 for the "funds" variable (which can be generated by the state space tree generator/updater 170). The state space tree 500 represents the possible states of the "funds" variable that can be reached from the current state (up to a certain depth). As shown in the diagram, the root node of the state space tree 500 is node 505. This node 505 represents the current state of the "funds" variable, which in this example is a value of 535. Each of the descendant nodes stemming from the root node 505 represent a possible state that can be reached from the current state. For the sake of illustration, it is assumed that transactions on the "funds" variable are made in multiples of 100. However, it should be understood that transactions can be made using different increments. In this example, node 510 represents the state where 100 is added to the "funds" variable (such that the value is 635). Node 520 represents the state where 200 is added to the "funds" variable (such that the value is 735). Node 525 represents the state where 300 is added to the "funds" variable (such that the value is 835). Node 530 represents the state where 400 is added to the "funds" variable (such that the value is 935). Node 535 represents the state where 500 is added to the "funds" variable (such that the value is 1,035). Node 515 represents the state where 100 is subtracted from the "funds" variable (such that the value is 435). In this example, nodes 510, 520, 525, and 530 represent valid states since the value of the "funds" variable in these states is greater than or equal to 500 and less than or equal to 1,000. However, nodes 515 and 530 represent invalid states since the value of the "funds" variable in these states is either less than 500 or greater than 1,000 (which is a smart contract violation in smart contract 410A and smart contract 410B, respectively). In this example, the depth of the state space tree 500 is 5 (counted as the number of edges on the longest path from the root node 505 to a leaf node (node 535)). The depth is a parameter that can be specified by a user. Increasing the depth will generally require more extensive computations to generate the state space tree, but may allow for earlier predictions. In this example, there are two nodes in the state space tree that represent smart contract violations out of a total of six nodes. As such, the violation predictor 180 determines that the percentage of nodes that result in a smart contract violation is 33 percent. If the requirement that needs to be met in order to report a prediction of a smart contract violation is set at 25 percent, then the violation predictor 180 would send an alert given this state space tree 500. However, if the requirement is set at a higher threshold such as 50 percent, then the violation predictor 180 would not send an alert given this state space tree 500. For the sake of illustration, the state space tree 500 for a single variable of interest (the "funds" variable) is shown. In one embodiment, if there are multiple variables of interest, a state space tree can be generated for each variable of interest, and smart contract violations can be predicted based on analyzing each of the state space trees.

Figure 6:
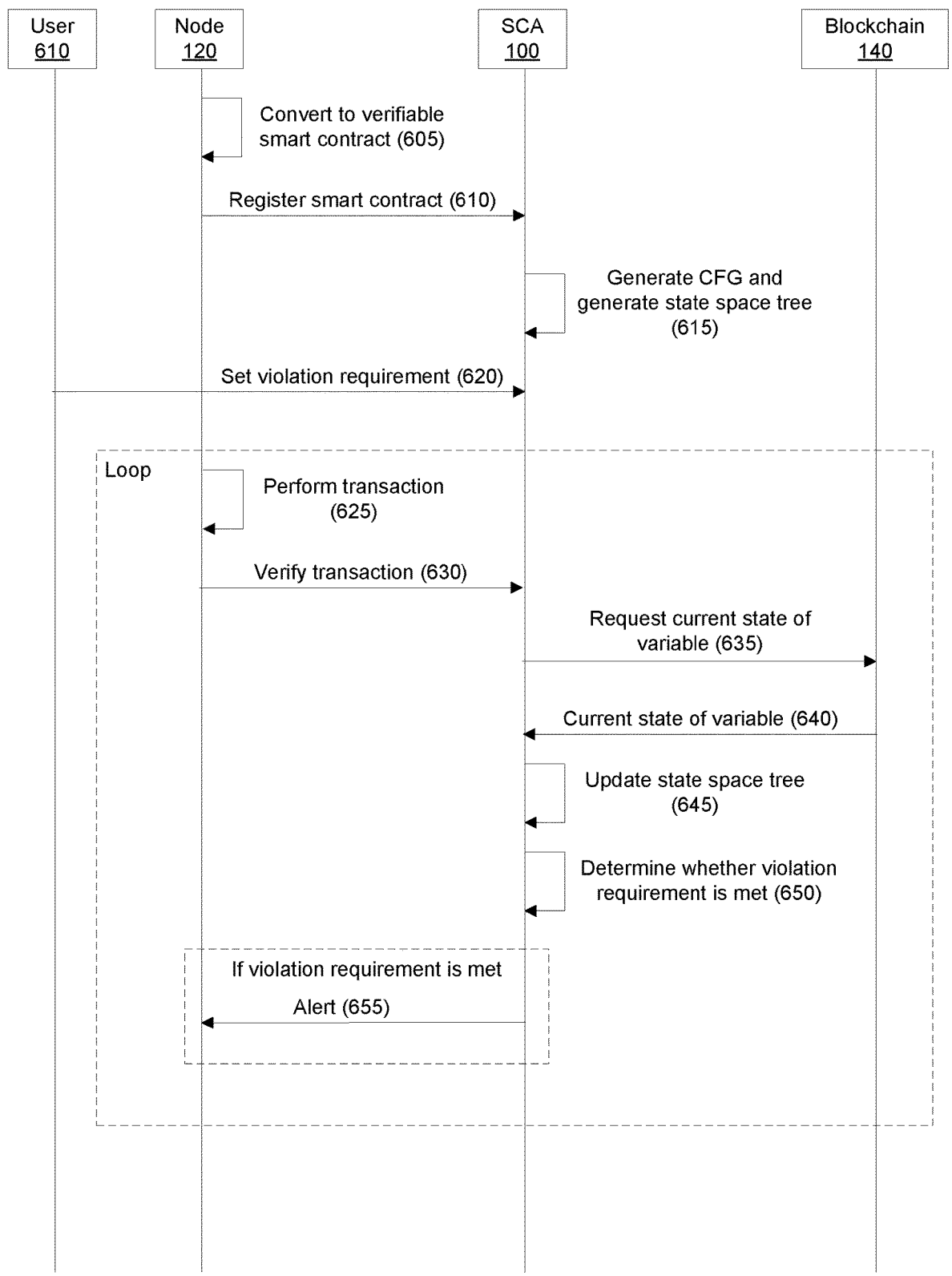
FIG. 6 is a diagram illustrating a sequence of operations for predicting smart contract violations, according to some embodiments.

FIG. 6 is a diagram illustrating a sequence of operations for predicting smart contract violations, according to some embodiments. As shown in the diagram, a computing node 120 converts a smart contract that it wants to register with the smart contract agent 100 to a verifiable smart contract (e.g., by adding a call to the "verify" function after each transaction that updates the variable of interest) (operation 605). The computing node 120 then registers the (converted) smart contract with the smart contract agent 100 (e.g., by calling the "registerSCA( )" function), which enables prediction for the smart contract (e.g., by setting the "ifReq" variable to "true") (operation 610). In response, the smart contract agent 100 generates a control flow graph for the smart contract (e.g., by calling the "constructCFG( )" function) and generates an initial state space tree (e.g., by calling the "constructTree( )" function) (operation 615), where the root node of the state space tree represents the current state of the variable of interest and the descendant nodes stemming from the root node represent the possible states of the variable of interest that can be reached from the current state. At any time, the user 610 may set the violation requirement (e.g., by calling the "SetRequirements( ) function) (operation 620). The user 610 may also set the maximum depth of the state space tree (e.g., by calling the "SetDepth( )" function).

Following each transaction performed on the variable of interest (operation 625), the computing node 120 makes a request to the smart contract agent 100 to verify the transaction (e.g., by calling the "verify( )" function) (operation 630). In response, the smart contract agent 100 performs the verification by requesting the current state of the variable of interest from the blockchain 140 (e.g., by calling the "getState( )" function) (operation 635), receiving the current state of the variable of interest from the blockchain 140 (operation 640), and updating the state space tree to reflect the current state of the variable of interest (e.g., by calling the "update( )" function) (operation 645). The smart contract agent 100 determines whether the updated state space tree meets the predefined violation requirement (e.g., the violation requirement set by the user 610) (operation 650). If the smart contract agent 100 determines that the violation requirement is met, then it sends an alert to the computing node 120 (indicating a smart contract violation is predicted) (e.g., as part of the "reportViolationIfAny( )" function) (operation 655). In one embodiment, the smart contract agent 100 may also send the scenarios that lead to smart contract violations to the computing node 120 (e.g., the smart contract agent 100 may determine this by following the branches in the state space tree that result in a smart contract violation).

Figure 7:
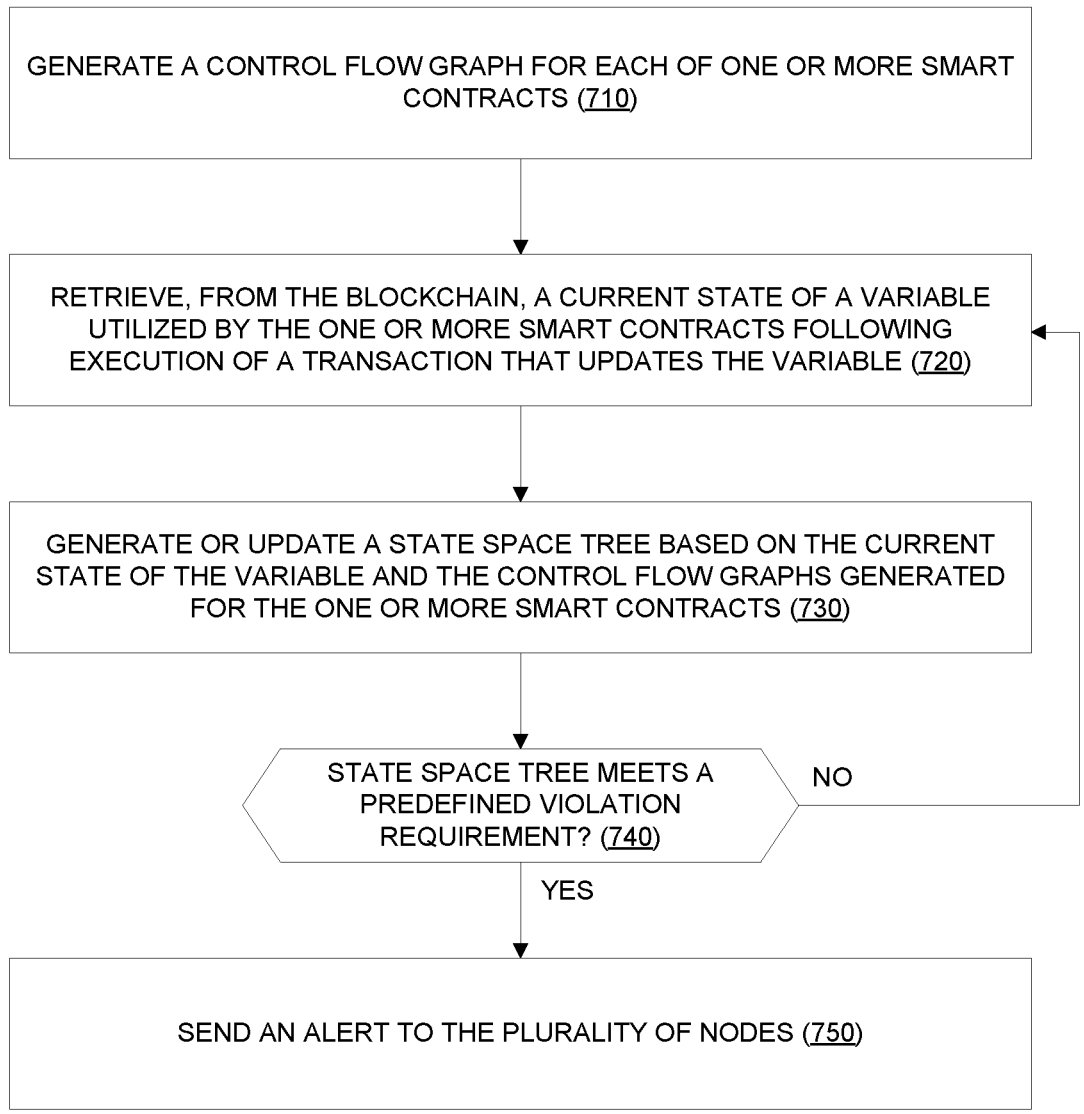
FIG. 7 is a flow diagram of a process for predicting smart contract violations, according to some embodiments.

FIG. 7 is a flow diagram of a process for predicting smart contract violations, according to some embodiments. In one embodiment, the process is implemented by a network device (e.g., acting as a smart contract agent 100) that is communicatively coupled to one or more computing nodes 120 that execute one or more smart contracts that are configured to perform transactions on a blockchain 140. The process may be implemented using any combination of hardware, software, and firmware. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 710, the network device generates a control flow graph for each of one or more smart contracts. In one embodiment, the network device receives a request (e.g., from a computing node 120) to register a new smart contract and generates a control flow graph for the new smart contract in response to receiving the request to register the new smart contract.

At block 720, the network device retrieves, from the blockchain 140, a current state of a variable utilized by the one or more smart contracts following execution of a transaction that updates the variable.

At block 730, the network device generates or updates a state space tree based on the current state of the variable and the control flow graphs generated for the one or more smart contracts. In one embodiment, the state space tree includes a root node and one or more descendant nodes stemming from the root node, where the root node represents the current state of the variable and the descendant nodes represent possible states of the variable that can be reached from the current state. In one embodiment, the state space tree is generated or updated to have a preconfigured depth. In one embodiment, the state space tree is generated or updated as a result of a computing node 120 from the one or more computing nodes executing a function call inserted into a smart contract (e.g., the "registerSCA( )" function or the "verify( )" function).

At block 740, the network device determines whether the state space tree meets a predefined violation requirement. In one embodiment, the state space tree is determined to meet the violation requirement if the percentage of nodes in the state space tree that result in a smart contract violation (e.g., the nodes that are in an invalid state) is greater than a threshold percentage specified by the violation requirement. If the state space tree does not meet the predefined violation requirement, then the process returns to block 720. However, if the state space tree meets the predefined violation requirement, then the network device sends an alert to the one or more computing nodes 120 (indicating that a smart contraction violation is predicted). In one embodiment, the alert includes an indication of one or more scenarios that will lead to a smart contract violation.

In one embodiment, the network device trains a machine learning system to predict a smart contract violation based on learning a history of state space trees that resulted in a smart contract violation and predicts a smart contract violation using the machine learning system.

In this manner, the process dynamically predicts smart contract violations during runtime as smart contracts are being executed. The prediction allows users and/or applications to intervene before a smart contract violation occurs (e.g., they can decide to stop the execution or continue the execution with additional monitoring/guidance). This helps avoid unnecessary mining (e.g., contenders working on proof of work or proof of space), which results in being able to conserve valuable computing resources and power.

Figure 8A:
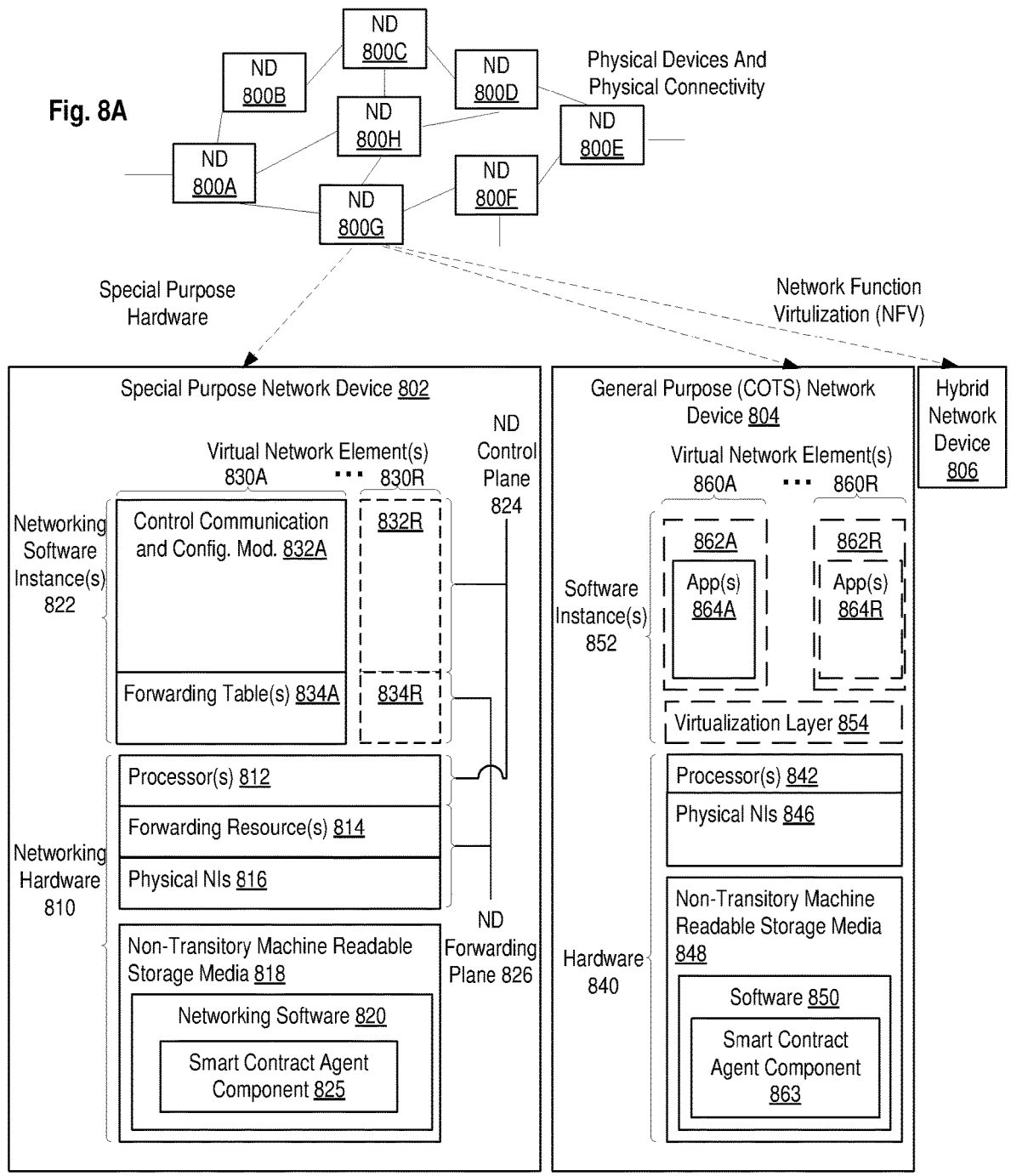
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as smart contract agent component 825, which when executed by networking hardware 810, causes the special-purpose network device 802 to perform operations of one or more embodiments described herein above as part networking software instances 822 (e.g., to provide smart contract violation prediction functionality described herein).

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
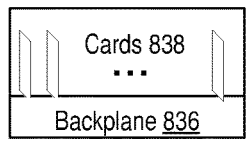
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as smart contract agent component 863, which when executed by processor(s) 842, cause the general purpose network device 804 to perform operations of one or more embodiments described herein above as part software instances 862A-R (e.g., to provide smart contract violation prediction functionality described herein).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method by a network device to predict smart contract violations before their occurrence, wherein the network device is communicatively coupled to more than one computing nodes that execute more than one smart contracts that are configured to perform transactions on a blockchain, the method comprising:
generating control flow graphs for each of the more than one smart contracts, wherein the control flow graphs represent execution paths that are traversed in the more than one smart contracts;
retrieving, from the blockchain, current states of variables utilized by the more than one smart contracts following execution of transactions that update the variables;
generating or updating a state space tree based on the current states of the variables and the control flow graphs generated for the more than one smart contracts, wherein the generating of the state space tree is a result of a computing node from the more than one computing nodes executing a function call inserted into a smart contract and the interleaving of the transactions from the control flow graphs;

dynamically predicting a smart contract violations, during runtime as the more than one smart contracts are being executed, by determining whether the state space tree meets a predefined violation requirement based on determining a number of computing nodes in the state space tree that represent states of the variables that are considered to be the smart contract violation;

sending an alert to the more than one computing nodes in response to determining that the state space tree meets the predefined violation requirement, wherein the alert includes an indication of one or more scenarios that lead to the smart contract violation; and debugging to identify a point of failure in the more than one smart contracts by the more than one computing nodes based on the alert.

2. The method of claim 1, further comprising:
receiving a request to register a new smart contract; and
generating a control flow graph for the new smart contract in response to receiving the request to register the new smart contract.

3. The method of claim 1, wherein the state space tree includes a root node and one or more descendant nodes stemming from the root node, and wherein the root node represents the current states of the variables and the descendant nodes represent possible states of the variables that can be reached from the current states.

4. The method of claim 1, wherein the state space tree is generated or updated to have a preconfigured depth.

5. The method of claim 1, wherein the state space tree is determined to meet the predefined violation requirement if a percentage of computing nodes in the state space tree that result in the smart contract violation is greater than a threshold percentage specified by the predefined violation requirement.

6. The method of claim 1, further comprising:
training a machine learning system to predict the smart contract violation based on learning a history of state space trees that resulted in prediction of the smart contract violation; and
predicting the smart contract violation using the machine learning system.

7. A network device configured to predict a smart contract violations before its occurrence, wherein the network device is to be communicatively coupled to more than one computing nodes that execute more than one smart contracts that are configured to perform transactions on a blockchain, the network device comprising:
a set of one or more processors; and
a non-transitory machine-readable storage medium having stored therein a smart contract agent component, which when executed by the set of one or more processors, causes the network device to generate a control flow graphs for each of the more than one smart contracts, wherein the control flow graphs represent execution paths that are traversed in the more than one smart contracts, retrieve, from the blockchain, current states of variables utilized by the more than one smart contracts following execution of transactions that update the variables, generate a state space tree based on the current states of the variables and the control flow graphs generated for the more than one smart contracts, wherein the generating of the state space tree is a result of a computing node from the more than one computing nodes executing a function call inserted into a smart contract and the interleaving of the transactions from the control flow graphs, dynamically predicting the-smart contract violation, during runtime as the more than one smart contracts are being executed, by determining whether the state space tree meets a predefined violation requirement based on determining a number of computing nodes in the state space tree that represent states of the variables that are considered to be the smart contract violation, send an alert to the more than one computing nodes in response to determining that the state space tree meets the predefined violation requirement, wherein the alert includes an indication of one or more scenarios that lead to the smart contract violation, and debug to identify a point of failure in the more than one smart contracts by the more than one computing nodes based on the alert.

8. The network device of claim 7, wherein the smart contract agent component, when executed by the set of one or more processors, further causes the network device to receive a request to register a new smart contract and generate a control flow graph for the new smart contract in response to receiving the request to register the new smart contract.

9. The network device of claim 7, wherein the state space tree includes a root node and one or more descendant nodes stemming from the root node, and wherein the root node represents the current states of the variables and the descendant nodes represent possible states of the variables that can be reached from the current states.

10. The network device of claim 7, wherein the state space tree is generated or updated to have a preconfigured depth.

11. The network device of claim 7, wherein the state space tree is determined to meet the predefined violation requirement if a percentage of computing nodes in the state space tree that result in the smart contract violation is greater than a threshold percentage specified by the predefined violation requirement.

12. A non-transitory machine-readable medium having computer code stored therein, which when executed by a set of one or more processors of a network device communicatively coupled to more than one computing nodes that execute more than one smart contracts that are configured to perform transactions on a blockchain, causes the network device to perform operations for predicting smart contract violations before their occurrence, the operations comprising:
generating control flow graphs for each of the more than one smart contracts, wherein the control flow graphs represent execution paths that are traversed in the more than one smart contracts;
retrieving, from the blockchain, current states of variables utilized by the more than one smart contracts following execution of transactions that update the variables;
generating or updating a state space tree based on the current states of the variables and the control flow graphs generated for the more than one smart contracts, wherein the generating of the state space tree is a result of a computing node from the more than one computing nodes executing a function call inserted into a smart contract and the interleaving of the transactions from the control flow graphs;
dynamically predicting a smart contract violations, during runtime as the more than one smart contracts are being executed, by determining whether the state space tree meets a predefined violation requirement based on determining a number of computing nodes in the state space tree that represent states of the variables that are considered to be a smart contract violation;

sending an alert to the more than one computing nodes in response to determining that the state space tree meets the predefined violation requirement, wherein the alert includes an indication of one or more scenarios that will lead to the smart contract violation; and debugging to identify a point of failure in the more than one smart contracts by the more than one computing nodes based on the alert.

13. The non-transitory machine-readable medium of claim 12, wherein the computer code, when executed by the set of one or more processors of the network device, causes the network device to perform further operations comprising:

receiving a request to register a new smart contract; and generating a control flow graph for the new smart contract in response to receiving the request to register the new smart contract.

14. The non-transitory machine-readable medium of claim 12, wherein the state space tree includes a root node and one or more descendant nodes stemming from the root node, and wherein the root node represents the current states of the variables and the descendant nodes represent possible states of the variables that can be reached from the current states.

15. The non-transitory machine-readable medium of claim 12, wherein the state space tree is generated or updated to have a preconfigured depth.

16. The non-transitory machine-readable medium of claim 12, wherein the computer code, when executed by the set of one or more processors of the network device, causes the network device to perform further operations comprising:

training a machine learning system to predict the smart contract violation based on learning a history of state space trees that resulted in prediction of the smart contract violation; and predicting the smart contract violation using the machine learning system.

* * * * *